US012735539B2

(12) United States Patent
Aramaki et al.

(10) Patent No.: US 12,735,539 B2
(45) Date of Patent: Sep. 15, 2026

(54) THERMALLY CONDUCTIVE SHEET AND PRODUCTION METHOD FOR THERMALLY CONDUCTIVE SHEET

(71) Applicant: SEKISUI CHEMICAL CO., LTD., Osaka (JP)

(72) Inventors: Keisuke Aramaki, Shimotsuke (JP); Yuma Sato, Shimotsuke (JP); Yusuke Kubo, Shimotsuke (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 634 days.

(21) Appl. No.: 18/025,687

(22) PCT Filed: Aug. 6, 2021

(86) PCT No.: PCT/JP2021/029334
§ 371 (c)(1),
(2) Date: Mar. 10, 2023

(87) PCT Pub. No.: WO2022/054478
PCT Pub. Date: Mar. 17, 2022

(65) Prior Publication Data

US 2023/0348679 A1 Nov. 2, 2023

(30) Foreign Application Priority Data

Sep. 14, 2020 (JP) ................................ 2020-153479

(51) Int. Cl.
*C08J 5/18* (2006.01)
*C08K 7/18* (2006.01)
*C08K 9/02* (2006.01)

(52) U.S. Cl.
CPC .................. *C08J 5/18* (2013.01); *C08K 7/18* (2013.01); *C08K 9/02* (2013.01); *C08J 2383/04* (2013.01); *C08K 2201/001* (2013.01); *C08K 2201/013* (2013.01)

(58) Field of Classification Search
None
See application file for complete search history.

(56) References Cited

U.S. PATENT DOCUMENTS

2003/0038278 A1* 2/2003 Ishihara .............. H01L 23/3733 257/E23.009
2016/0118316 A1 4/2016 Aramaki et al.
2019/0019739 A1 1/2019 Kanaya et al.
2019/0035712 A1* 1/2019 Kanaya .................... C08K 3/28
2021/0163708 A1 6/2021 Mukai et al.
2021/0391636 A1* 12/2021 Kang ....................... H05K 7/20
2023/0295398 A1* 9/2023 Kobune ................. C08K 3/042 257/712

FOREIGN PATENT DOCUMENTS

JP 2012023335 A 2/2012
JP 2015035580 A 2/2015
JP 2017130652 A 7/2017
JP 6200119 B1 9/2017

OTHER PUBLICATIONS

International Search Report issued Sep. 14, 2021 in PCT/JP2021/029334 (with English translation), 6 pages.
Office Action issued Sep. 14, 2021 in Japanese Patent Application No. 2020-153479 (with English translation), 12 pages.
Written Opinion issued Sep. 14, 2021 in PCT/JP2021/029334 (with English translation), 13 pages.

* cited by examiner

*Primary Examiner* — Robert T Butcher
(74) *Attorney, Agent, or Firm* — Wenderoth, Lind & Ponack, L.L.P.

(57) ABSTRACT

A thermally conductive sheet includes: a binder resin; and a first thermally conductive filler oriented in a thickness direction of the thermally conductive sheet. The thermally conductive sheet has a contact thermal resistance with regard to an adherend of 0.46° C.·cm$^2$/W or less. The first thermally conductive filler is preferably a fibrous thermally conductive filler and/or a flaky thermally conductive filler. The thermally conductive sheet preferably further includes a second thermally conductive filler which is at least one selected from a group consisting of alumina, aluminum, zinc oxide, boron nitride, aluminum nitride, graphite, and a magnetic powder.

16 Claims, 2 Drawing Sheets

THERMALLY CONDUCTIVE SHEET AND PRODUCTION METHOD FOR THERMALLY CONDUCTIVE SHEET

TECHNICAL FIELD

The present technology relates to a thermally conductive sheet and a production method for a thermally conductive sheet. The present application claims priority to Japanese Patent Application No. JP 2020-153479 filed on Sep. 14, 2020, in Japan, the contents of which are incorporated herein by reference in their entirety.

BACKGROUND TECHNOLOGY

Conventionally, in semiconductor elements equipped in various electrical apparatuses, such as personal computers, and other apparatuses, heat is generated due to driving, and accumulation of the generated heat adversely affects peripheral apparatuses and the driving of the semiconductor element. As such, various cooling means are normally used. As cooling methods for an electronic component such as a semiconductor element, a method of attaching a fan to an electrical apparatus and cooling air in a case of the electrical apparatus, a method of attaching a heat sink, such as radiator fins or a radiator plate, to a semiconductor element to be cooled, and the like are known.

When cooling by attaching a heat sink to a semiconductor element, a thermally conductive sheet is provided between the semiconductor element and the heat sink for efficient dissipation of heat from the semiconductor element. As the thermally conductive sheet, one in which a filler (for example, a thermally conductive filler such as carbon fibers) is dispersed/contained in a silicone resin is widely used (see Patent Document 1). For example, carbon fibers as a thermally conductive filler are known to have a thermal conductivity of approximately 600 to 1,200 W/m·K in a fiber direction. Moreover, boron nitride as a thermally conductive filler is known to have a thermal conductivity of approximately 110 W/m·K in a surface direction and approximately 2 W/m·K in a direction perpendicular to the surface direction.

Now, in thermally conductive sheets, it is known that a high thermal conductivity alone does not make it easier to provide a small contact thermal resistance and that an apparent thermal resistance is far greater. This is because a thermal resistance of a contact portion between a heat-generating body as an adherend and the thermally conductive sheet and a thermal resistance of a contact portion between a heat-radiating body and the thermally conductive sheet are involved to a significant extent. The contact thermal resistance affects not only the thermal conductivity of the thermally conductive sheet but also an adhesion of the contact portion between the adherend and the thermally conductive sheet. Generally, a thermally conductive sheet made by being highly filled with a thermally conductive filler tends to lack flexibility. Therefore, to suppress a contact thermal resistance of a thermally conductive sheet with regard to an adherend, sufficient adhesion to and shape tracking of the adherend are necessary. As such, it is desirable to optimize an amount of the thermally conductive filler in the thermally conductive sheet according to a surface shape of the adherend. However, a part where the thermally conductive sheet is used may actually be inclined or not be a smooth face.

Patent Documents 1 and 2 teach a thermally conductive sheet wherein an anisotropic material such as carbon fibers or boron nitride is aligned in a thickness direction of the sheet. In such a thermally conductive sheet, the anisotropic material can be aligned in the thickness direction of the thermally conductive sheet by, for example, making a molded block from a resin composition for forming a thermally conductive sheet and slicing the molded block. However, when a thermally conductive sheet is made by slicing a molded block in this manner, a contact thermal resistance of the thermally conductive sheet tends to be high. To lessen loading on an adherend (for example, a substrate) of the thermally conductive sheet, there is a demand for being able to use a thermally conductive sheet of the lowest load possible. Moreover, thinner thermally conductive sheets are in demand due to increased requests in recent years for thinner semiconductor elements. In this manner, providing a low contact thermal resistance for a thermally conductive sheet with regard to an adherend is crucial. To provide a low total thermal resistance for the thermally conductive sheet, it is necessary to, for example, make a surface of the thermally conductive sheet smoother or design the sheet to be softer so as to provide a low contact thermal resistance.

CITATION LIST

Patent Documents

Patent Document 1: Japanese Unexamined Patent Application Publication No. 2012-23335

Patent Document 2: Japanese Patent No. 6200119

SUMMARY OF INVENTION

Problem to be Solved by Invention

The present technology is proposed in view of these conventional circumstances and provides a thermally conductive sheet of a low contact thermal resistance with regard to an adherend.

Means to Solve the Problem

A thermally conductive sheet of the present technology includes: a binder resin; and a first thermally conductive filler aligned in a thickness direction of the thermally conductive sheet; wherein a contact thermal resistance with regard to an adherend is 0.46° C.·cm$^2$/W or less.

A production method for a thermally conductive sheet of the present technology has: a step A of preparing a resin composition, for forming a thermally conductive sheet, by dispersing a first thermally conductive filler in a binder resin; a step B of forming a molded block from the resin composition for forming a thermally conductive sheet; and a step C of slicing the molded block into a sheet to obtain a thermally conductive sheet; wherein the thermally conductive sheet has the first thermally conductive filler aligned in a thickness direction and has a contact thermal resistance with regard to an adherend of 0.46° C.·cm$^2$/W or less.

Effect of the Invention

According to the present technology, a thermally conductive sheet of a low contact thermal resistance with regard to an adherend can be provided.

DESCRIPTION OF THE EMBODIMENTS

In the present description, an average particle size (D50) of a thermally conductive filler refers to a particle size in which when an overall particle size distribution of a thermally conductive filler is 100% and a cumulative curve of values of the particle sizes is found from a small-particle-size side of the particle size distribution, this cumulative value is 50%. A grain size distribution (particle size distribution) in the present description is found based on volume. As a measurement method for a grain size distribution, for example, a method of using a laser-diffraction grain size distribution measuring machine can be mentioned.

<Thermally Conductive Sheet>

Figure 1:
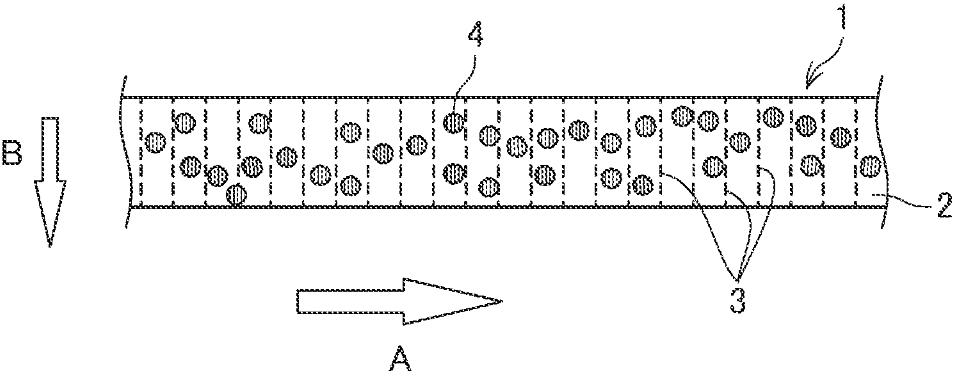
FIG. 1 is a sectional view illustrating one example of a thermally conductive sheet of the present technology.

FIG. 1 is a sectional view illustrating one example of a thermally conductive sheet 1 of the present technology. The thermally conductive sheet 1 includes a binder resin 2 and a first thermally conductive filler 3 aligned in a thickness direction B of the thermally conductive sheet 1 and may further include, as necessary, a second thermally conductive filler 4 other than the first thermally conductive filler 3. Such a thermally conductive sheet 1 has a low contact thermal resistance of 0.46° C.·cm$^2$/W or less with regard to an adherend (for example, a smooth face or an uneven face of an adherend) and thus provides favorable thermal conductivity. Interposing such a thermally conductive sheet 1 between adherends (for example, between a heat-generating body and a heat-radiating body) can more effectively reduce a thermal resistance of the thermally conductive sheet 1.

For the thermally conductive sheet 1, the lower the contact thermal resistance with regard to the adherend, the more preferable. The contact thermal resistance can be 0.40° C.·cm$^2$/W or less, 0.35° C.·cm$^2$/W or less, 0.30° C.·cm$^2$/W or less, 0.27° C.·cm$^2$/W or less, 0.25° C.·cm$^2$/W or less, or 0.20° C.·cm$^2$/W or less. A lower limit of the contact thermal resistance of the thermally conductive sheet 1 with regard to the adherend is not particularly limited and can be, for example, 0.10° C.·cm$^2$/W or greater. The contact thermal resistance of the thermally conductive sheet 1 can be measured according to the method of the examples described below.

The thermally conductive sheet 1 can have a thermal resistance at a load of 1 kgf/cm$^2$ of 3.00° C.·cm$^2$/W or less, 2.71° C.·cm$^2$/W or less, 2.50° C.·cm$^2$/W or less, 2.00° C.·cm$^2$/W or less, 1.60° C.·cm$^2$/W or less, 1.20° C.·cm$^2$/W or less, 1.00° C.·cm$^2$/W or less, or 0.50° C.·cm$^2$/W or less. In this manner, the thermally conductive sheet 1 has a low thermal resistance at a low load and can thus be used even in a state where no high load is applied. A lower limit of the thermal resistance of the thermally conductive sheet 1 at a load of 1 kgf/cm$^2$ is not particularly limited and can be, for example, 0.250° C.·cm$^2$/W or greater. The thermal resistance of the thermally conductive sheet 1 can be measured according to the method of the examples described below.

The thermally conductive sheet 1 can have a thermal conductivity of 10.0 W/m·K or greater, 11.0 W/m·K or greater, 11.5 W/m·K or greater, 20.0 W/m·K or greater, or 30.0 W/m·K or greater. The thermal conductivity of the thermally conductive sheet 1 can be measured according to the method of the examples described below.

The thermally conductive sheet 1 preferably has a high breakdown voltage. A breakdown voltage of when a thickness is 1 mm can be 0.50 kV or greater, 0.90 kV or greater, 1.10 kV or greater, or 6.0 kV or greater. An upper limit of the breakdown voltage of the thermally conductive sheet 1 is not particularly limited and can be, for example, 10.0 kV or less. The breakdown voltage of the thermally conductive sheet 1 can be measured according to the method of the examples described below.

An average thickness of the thermally conductive sheet 1 can be selected as appropriate according to an object thereof and can be, for example. 0.05 mm or greater or 0.1 mm or greater. Moreover, an upper limit of the average thickness of the thermally conductive sheet 1 can be, for example, 5 mm or less, 4 mm or less, 3 mm or less, 1 mm or less, 0.5 mm or less, or 0.3 mm or less. From a viewpoint of handling the thermally conductive sheet 1, the average thickness of the thermally conductive sheet 1 is preferably 0.1 to 4 mm. The average thickness of the thermally conductive sheet 1 can be found by, for example, measuring the thickness of the thermally conductive sheet 1 at any five locations and finding the arithmetical mean thereof.

Components of the thermally conductive sheet 1 are described below.

<Binder Resin>

The binder resin 2 holds the first thermally conductive filler 3 in the thermally conductive sheet 1 and, as necessary, also holds the second thermally conductive filler 4 in the thermally conductive sheet 1. The binder resin 2 is selected according to characteristics such as mechanical strength, thermal resistance, and electrical properties that are demanded of the thermally conductive sheet 1. The binder resin 2 can be selected from among a thermoplastic resin, a thermoplastic elastomer, and a thermosetting resin.

As the thermoplastic resin, polyethylene, polypropylene, an ethylene-α olefin copolymer such as an ethylene-propylene copolymer, polymethylpentene, polyvinyl chloride, polyvinylidene chloride, polyvinyl acetate, an ethylene-vinyl acetate copolymer, polyvinyl alcohol, polyvinyl acetal, a fluoropolymer such as polyvinylidene fluoride or polytetrafluoroethylene, polyethylene terephthalate, polybutylene terephthalate, polyethylene naphthalate, polystyrene, polyacrylonitrile, a styrene-acrylonitrile copolymer, an acrylonitrile-butadiene-styrene copolymer (ABS) resin, a polyphenylene ether copolymer (PPE) resin, a modified PPE resin, an aliphatic polyamide, an aromatic polyamide, polyimide, polyamide-imide, poly(methacrylic acid), a poly(methacrylic-acid ester) such as poly(methacrylic-acid methyl ester), a poly(acrylic acid), polycarbonate, polyphenylene sulfide, polysulfone, polyethersulfone, polyethernitrile, polyetherketone, polyketone, a liquid crystal polymer, a silicone resin, an ionomer, and the like can be mentioned.

As the thermoplastic elastomer, a styrene-butadiene block copolymer or a hydrogenated product thereof, a styrene-isoprene block copolymer or a hydrogenated product thereof, a styrene thermoplastic elastomer, an olefin thermoplastic elastomer, a vinyl chloride thermoplastic elastomer, a polyester thermoplastic elastomer, a polyurethane thermoplastic elastomer, a polyamide thermoplastic elastomer, and the like can be mentioned.

As the thermosetting resin, a cross-linked rubber, an epoxy resin, a phenol resin, a polyimide resin, an unsaturated polyester resin, a diallyl phthalate resin, and the like can be mentioned. As specific examples of the cross-linked rubber, natural rubber, acrylic rubber, butadiene rubber, isoprene rubber, a styrene-butadiene copolymer rubber, nitrile rubber, hydrogenated nitrile rubber, chloroprene rubber, an ethylene-propylene copolymer rubber, chlorinated polyethylene rubber, chlorosulfonated polyethylene rubber, butyl rubber, halogenated butyl rubber, fluororubber, urethane rubber, and silicone rubber can be mentioned.

As the binder resin 2, in consideration of, for example, adhesion between a heat-generating face of an electronic component and a heat-sink face, a silicone resin is preferable. As the silicone resin, for example, a two-part addition-reaction silicone resin made of a main agent, which includes silicone having an alkenyl group as a main component and contains a curing catalyst, and a curing agent having a hydrosilyl group (Si—H group) can be used. As the silicone having an alkenyl group, for example, polyorganosiloxane having a vinyl group can be used. The curing catalyst is a catalyst for promoting an addition reaction between the alkenyl group in the silicone having an alkenyl group and the hydrosilyl group in the curing agent having a hydrosilyl group. As the curing catalyst, catalysts that are well known as a catalyst used in a hydrosilylation reaction can be mentioned. For example, a platinum-group curing catalyst—for example, platinum, rhodium, palladium, or another platinum-group metal alone or platinum chloride—can be used. As the curing agent having a hydrosilyl group, for example, polyorganosiloxane having a hydrosilyl group can be used. As the binder resin 2, one type alone may be used, or two or more types may be used in combination.

A content of the binder resin 2 in the thermally conductive sheet 1 is not particularly limited and can be selected as appropriate according to an object thereof. For example, the content of the binder resin 2 in the thermally conductive sheet 1 can be 20% by volume or greater, 25% by volume or greater, 28% by volume or greater, or 30% by volume or greater. Moreover, an upper limit of the content of the binder resin 2 in the thermally conductive sheet 1 can be 50% by volume or less, 40% by volume or less, or 35% by volume or less. From a viewpoint of flexibility of the thermally conductive sheet 1, the content of the binder resin 2 in the thermally conductive sheet 1 is preferably 25 to 50% by volume or 25 to 35% by volume.

<First Thermally Conductive Filler>

The first thermally conductive filler 3 is a thermally conductive filler that can be oriented in the thickness direction B of the thermally conductive sheet 1. As the first thermally conductive filler 3, one type may be used alone, or two or more types may be used in combination. The first thermally conductive filler 3 may be, for example, a flaky thermally conductive filler, a fibrous thermally conductive filler, or a combination of a flaky thermally conductive filler and a fibrous thermally conductive filler.

[Flaky Thermally Conductive Filler]

The flaky thermally conductive filler is a thermally conductive filler having a major axis, a minor axis, and a thickness. It has a high aspect ratio (major axis/thickness) and has an isotropic thermal conductivity in a surface direction including the major axis. The minor axis is a direction intersecting the major axis of the flaky thermally conductive filler in a plane including the major axis of the flaky thermally conductive filler and refers to the length of the shortest portion of the flaky thermally conductive filler. The thickness refers to an average value of ten measurement points of a thickness of the plane including the major axis of the flaky thermally conductive filler.

Figure 2:
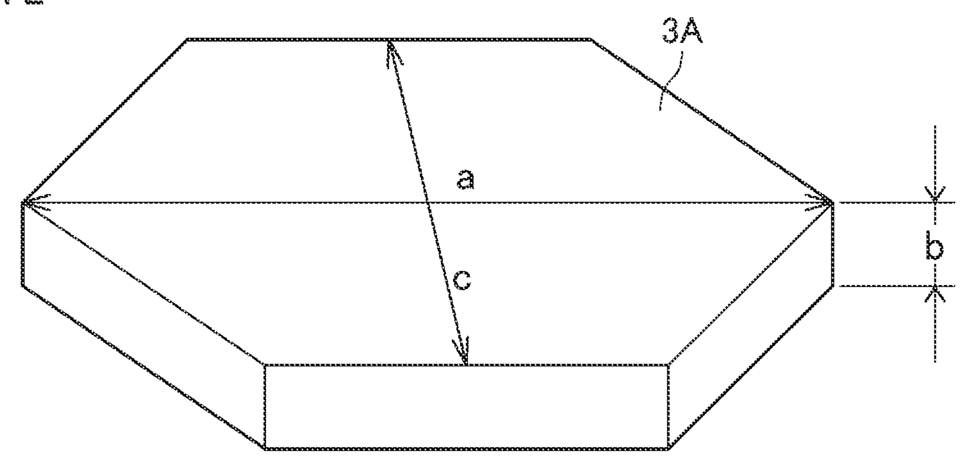
FIG. 2 is a perspective view schematically illustrating a boron nitride flake of a hexagonal crystal shape.

FIG. 2 is a perspective view schematically illustrating a boron nitride flake 3A of a hexagonal crystal shape that is one example of the first thermally conductive filler 3. In FIG. 2, a represents a major axis of the boron nitride flake 3A, b represents a thickness of the boron nitride flake 3A, and c represents a minor axis of the boron nitride flake 3A. As the first thermally conductive filler 3, from a viewpoint of the thermal conductivity of the thermally conductive sheet 1, it is preferable to use boron nitride flakes 3A of the hexagonal crystal shape as illustrated in FIG. 2. In the thermally conductive sheet 1, using a flaky thermally conductive filler (for example, the boron nitride flakes 3A), which is less expensive than a spherical thermally conductive filler (for example, boron nitride spheres), as the first thermally conductive filler 3 can provide excellent thermal characteristics. Moreover, when a flaky thermally conductive filler is used as the first thermally conductive filler 3, selectively orienting a major axis of the flaky thermally conductive filler in the thickness direction B of the thermally conductive sheet 1 can impart high thermal conductivity to the thermally conductive sheet 1 without filling the sheet with a large amount of the flaky thermally conductive filler.

An average particle size (D50) of the flaky thermally conductive filler is not particularly limited and can be selected as appropriate according to an object thereof. For example, an average particle size of the flaky thermally conductive filler can be 10 μm or greater and may be 20 μm or greater, 30 μm or greater, or 35 μm or greater. Moreover, an upper limit of the average particle size of the flaky thermally conductive filler can be 150 μm or less and may be 100 μm or less, 90 μm or less, 80 μm or less, 70 μm or less, 50 μm or less, or 45 μm or less. From a viewpoint of the thermal conductivity of the thermally conductive sheet 1, the average particle size of the flaky thermally conductive filler is preferably 20 to 100 μm.

The aspect ratio (major axis/thickness) of the flaky thermally conductive filler can be in a range of, for example, 10 to 100. When the boron nitride flakes 3A of the hexagonal crystal shape as illustrated in FIG. 2 are used as the flaky thermally conductive filler, it is favorable to calculate the aspect ratio of the flaky thermally conductive filler by arbitrarily selecting 200 or more boron nitride flakes 3A from an image photographed using SEM, finding respective ratios between the major axis a and the thickness b (a/b), and calculating an average value.

[Fibrous Thermally Conductive Filler]

The fibrous thermally conductive filler is not particularly limited as long as it is fibrous and has the necessary thermal conductivity. For example, carbon fibers and fibers made of a metal (such as copper, stainless steel, or nickel) can be mentioned. Moreover, from a viewpoint of high thermal conductivity and insulation, aluminum nitride fibers, ultra-high-molecular-weight polyethylene fibers, polyparaphenylene bisoxazole fibers, or the like can also be used. In the following, a situation in which carbon fibers are used as the fibrous thermally conductive filler is detailed as an example.

As the carbon fibers, for example, pitch carbon fibers, PAN carbon fibers, carbon fibers in which PBO fibers are graphitized, or carbon fibers synthesized by arc discharging, laser vaporization, CVD (chemical vapor deposition), CCVD (catalyst chemical vapor deposition), or the like can be used. Among these, from a viewpoint of thermal conductivity, pitch carbon fibers are preferable.

An average fiber length (average major-axis length) of the carbon fibers can be, for example, 50 to 250 μm and may be 75 to 200 μm or 90 to 170 μm. Moreover, an average fiber diameter (average minor-axis length) of the carbon fibers can also be selected as appropriate according to an object thereof and can be, for example, 4 to 20 μm and may be 5 to 14 μm. An aspect ratio (average major-axis length/average minor-axis length) of the carbon fibers can be selected as appropriate according to an object thereof and may be, for example, 8 or higher or 9 to 30. The average major-axis length and the average minor-axis length of the carbon fibers can be measured by, for example, a microscope or a scanning electron microscope (SEM).

Figure 3:
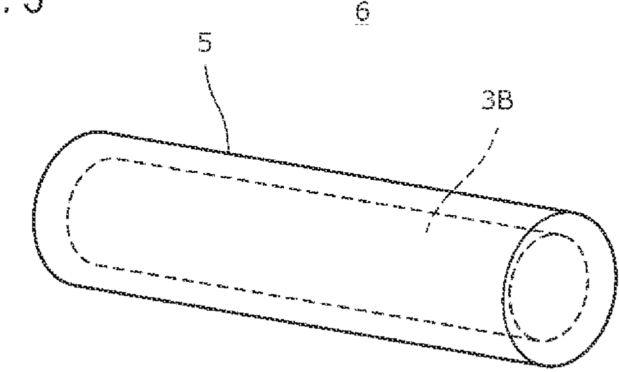
FIG. 3 is a perspective view illustrating one example of a carbon fiber coated by an insulating film.

FIG. 3 is a perspective view illustrating one example of a carbon fiber 3B coated by an insulating film 5. From a viewpoint of increasing insulation of the thermally conductive sheet 1, as illustrated in FIG. 3, a surface of the carbon fiber 3B is preferably coated by the insulating film 5. In this manner, an insulation-coated carbon fiber 6 can be used as the first thermally conductive filler 3. The insulation-coated carbon fiber 6 has the carbon fiber 3B and the insulating film 5 in at least one portion of the surface of the carbon fiber 3B and, as necessary, may contain another component.

The insulating film 5 is made of a material having electrical insulation and is formed of, for example, silicon oxide or a cured polymerizable material. The polymerizable material is, for example, a material that can undergo radical polymerization, and a polymerizable organic compound, a polymerizable resin, and the like can be mentioned. The material that can undergo radical polymerization can be selected as appropriate according to an object thereof as long as the material can undergo radical polymerization by using energy. For example, a compound having a double bond that can undergo radical polymerization can be mentioned. As the double bond that can undergo radical polymerization, for example, a vinyl group, an acryloyl group, and a methacryloyl group can be mentioned. From a viewpoint of strength, including thermal resistance and solvent resistance, a number of double bonds that can undergo radical polymerization in the compound having a double bond that can undergo radical polymerization is preferably two or more. As the compound having two or more double bonds that can undergo radical polymerization, for example, divinylbenzene (divinylbenzene: DVB) and a compound having two or more (meth)acryloyl groups can be mentioned. As the material that can undergo radical polymerization, one type alone may be used, or two or more types may be used in combination. A molecular weight of the material that can undergo radical polymerization can be selected as appropriate according to an object thereof and can be in a range of, for example, 50 to 500. When the insulating film 5 is formed of a cured polymerizable material, a content of structural units derived from the polymerizable material in the insulating film 5 can be, for example, 50% by mass or more or 90% by mass or more.

An average thickness of the insulating film 5 can be selected as appropriate according to an object thereof but is, from a viewpoint of realizing high insulation, preferably 50 nm or greater and may be 100 nm or greater or 200 nm or greater. An upper limit of the average thickness of the insulating film 5 can be, for example, 1,000 nm or less and may be 500 nm or less. The average thickness of the insulating film 5 can be found by, for example, transmission electron microscopy (TEM).

As methods of coating the carbon fiber 3B by the insulating film 5, for example, a sol-gel method, liquid-phase deposition, a polysiloxane method, and the method taught in paragraphs 0073 to 0089 of JP 2018-98515 A of forming an insulating film 5 made of a cured polymerizable material in at least one portion of a surface of a carbon fiber 3B can be mentioned.

A content of the first thermally conductive filler 3 in the thermally conductive sheet 1 is not particularly limited and can be selected as appropriate according to an object thereof. For example, a lower limit of the content of the first thermally conductive filler 3 in the thermally conductive sheet 1 can be 5% by volume or greater and may be 10% by volume or greater, 15% by volume or greater, 20% by volume or greater, or 25% by volume or greater. Moreover, an upper limit of the content of the first thermally conductive filler 3 in the thermally conductive sheet 1 can be 40% by volume or less and may be 35% by volume or less or 30% by volume or less.

For example, a content of the flaky thermally conductive filler in the thermally conductive sheet 1 is, from a viewpoint of the contact thermal resistance and the breakdown voltage of the thermally conductive sheet 1, preferably 20 to 30% by volume. Moreover, a content of the fibrous thermally conductive filler in the thermally conductive sheet 1 is, from a viewpoint of the contact thermal resistance and the breakdown voltage of the thermally conductive sheet 1, preferably 2% by volume or greater and may be 4% by volume or greater, 5% by volume or greater, or 8% by volume or greater. Moreover, an upper limit of the content of the fibrous thermally conductive filler in the thermally conductive sheet 1 can be, for example, 25% by volume or less and may be 20% by volume or less, 15% by volume or less, or 10% by volume or less. Note that the content of the fibrous thermally conductive filler represents a total amount of carbon fibers whose surface has no insulating coating and the insulation-coated carbon fibers 6. When using carbon fibers having no insulating coating as the first thermally conductive filler 3, from a viewpoint of the breakdown voltage of the thermally conductive sheet 1, a content of carbon fibers having no insulating coating in the thermally conductive sheet 1 is preferably 10% by volume or less.

<Second Thermally Conductive Filler>

The second thermally conductive filler 4 is a thermally conductive filler other than the first thermally conductive filler 3 and is, for example, a non-flaky and non-fibrous thermally conductive filler. As a specific example of the second thermally conductive filler 4, a spherical, powdered, granular, flat, or other thermally conductive filler can be mentioned. By using the first thermally conductive filler 3 and the second thermally conductive filler 4 in combination in the thermally conductive sheet 1, an orientation of the first thermally conductive filler 3 can be supported by the second thermally conductive filler 4, and the first thermally conductive filler 3 can be oriented in the thickness direction B of the thermally conductive sheet 1 as much as possible. From a viewpoint of the contact thermal resistance and the breakdown voltage of the thermally conductive sheet 1, a material of the second thermally conductive filler 4 is preferably at least one type selected from a group consisting of alumina, aluminum, zinc oxide, boron nitride, aluminum nitride, graphite, and a magnetic powder. As the second thermally conductive filler 4, one type may be used alone, or two or more types may be used in combination.

In particular, it is preferable to use alumina particles as the second thermally conductive filler 4. Moreover, it is also preferable to use as the second thermally conductive filler 4 a combination of aluminum nitride particles and alumina particles; a combination of aluminum nitride particles, alumina particles, and zinc oxide particles; a combination of aluminum nitride particles, alumina particles, and aluminum hydroxide particles; a combination of aluminum nitride particles, alumina particles, and boron nitride particles; or a combination of alumina particles, aluminum particles, and graphite particles.

An average particle size (D50) of the aluminum nitride particles can be 0.1 to 10 μm, 0.5 to 5 μm, 1 to 3 μm, or 1 to 2 μm. An average particle size (D50) of the alumina particles can be 1 to 20 μm, 2 to 16 μm, or 5 to 15 μm. An average particle size (D50) of the zinc oxide particles can be 0.1 to 5 μm, 0.5 to 3 μm, or 0.5 to 2 μm. An average particle size (D50) of the aluminum hydroxide particles can be 1 to 10 μm, 2 to 9 μm, or 5 to 9 μm. An average particle size (D50) of the aluminum particles can be 1 to 20 μm, 5 to 20 μm, or 10 to 18 μm. An average particle size (D50) of the graphite particles can be 1 to 20 μm, 2 to 16 μm, 3 to 10 μm, or 4 to 7 μm.

When the thermally conductive sheet 1 includes the second thermally conductive filler 4, a content of the second thermally conductive filler 4 in the thermally conductive sheet 1 can be selected as appropriate according to an object thereof. The content of the second thermally conductive filler 4 in the thermally conductive sheet 1 can be, for example, 30% by volume or more and may be 35% by volume or more, 40% by volume or more, or 45% by volume or more. Moreover, an upper limit of the content of the second thermally conductive filler 4 in the thermally conductive sheet 1 can be 70% by volume or less and may be 65% by volume or less, 60% by volume or less, or 55% by volume or less. Specifically, when using aluminum nitride particles and alumina particles in combination as the second thermally conductive filler 4, in the thermally conductive sheet 1, a content of the alumina particles is preferably 20 to 45% by volume, and a content of the aluminum nitride particles is preferably 20 to 35% by volume.

The thermally conductive sheet 1 may further contain another component other than the above components within a scope that does not impair the effects of the present technology. As the other component, for example, a silane coupling agent, a dispersant, a curing accelerator, a retardant, a tackifier, a plasticizer, a flame retardant, an antioxidant, a stabilizer, a colorant, and the like can be mentioned. For example, from a viewpoint of further improving a dispersion of the first thermally conductive filler 3 and the second thermally conductive filler 4 in the thermally conductive sheet 1 and further improving the flexibility of the thermally conductive sheet 1, a first thermally conductive filler 3 treated using a silane coupling agent and a second thermally conductive filler 4 treated using a silane coupling agent may be used.

As above, the thermally conductive sheet 1 includes the binder resin 2 and the first thermally conductive filler 3 aligned in the thickness direction B of the thermally conductive sheet 1 and has a contact thermal resistance with regard to the adherend of 0.46° C.·cm$^2$/W or less. As such, for example, a small contact thermal resistance with regard to a smooth face or uneven face of the adherend can be provided, and a favorable thermal conductivity can be obtained.

<Production Method for Thermally Conductive Sheet>

A production method for the thermally conductive sheet of the present technology has the following steps A, B, and C.

<Step A>

At step A, the first thermally conductive filler 3 is dispersed in the binder resin 2 to prepare a resin composition for forming a thermally conductive sheet. The resin composition for forming a thermally conductive sheet can be prepared by uniformly mixing, in addition to the first thermally conductive filler 3 and the binder resin 2, as necessary, the second thermally conductive filler 4, various additives, a volatile solvent, or the like by a known technique.

<Step B>

At step B, a molded block is formed from the prepared resin composition for forming a thermally conductive sheet. As a forming method for the molded block, an extrusion method, a molding method, and the like can be mentioned. The extrusion method and the molding method are not particularly limited, and from among various known extrusion methods and molding methods, an appropriate method can be adopted according to a viscosity of the resin composition for a thermally conductive sheet, characteristics required of the thermally conductive sheet, and the like.

For example, when extruding the resin composition for forming a thermally conductive sheet from a die in the extrusion method or when pressing the resin composition for forming a thermally conductive sheet into a mold in the molding method, the binder resin flows, and the first thermally conductive filler 3 is oriented in this flow direction.

A size and shape of the molded block can be determined according to a size of the thermally conductive sheet 1 that is being sought. For example, a rectangular parallelepiped whose cross section has a vertical size of 0.5 to 15 cm and a horizontal size of 0.5 to 15 cm can be mentioned. A length of the rectangular parallelepiped can be determined as necessary.

<Step C>

At step C, the molded block is sliced into a sheet to obtain the thermally conductive sheet 1. The first thermally conductive filler 3 is exposed on a surface (sliced face) of the sheet obtained by slicing. The thermally conductive sheet 1 obtained by slicing has a smoothed surface and can thus improve adhesion with another member and make thermal conductivity more favorable. Moreover, the thermally conductive sheet 1 obtained by slicing has a smoothed surface and can thus provide a smaller thermal resistance. A slicing method is not particularly limited and can be selected as appropriate from among known slicing devices according to the size and a mechanical strength of the molded block. In terms of a slicing direction of the molded block, when the molding method is an extrusion method, because, among other factors, the first thermally conductive filler 3 is oriented in an extrusion direction, the slicing direction is preferably 60 to 120 degrees relative to the extrusion direction-more preferably 70 to 100 degrees and further preferably 90 degrees (perpendicular) relative thereto.

In this manner, the production method for the thermally conductive sheet having steps A, B, and C can provide the thermally conductive sheet 1 that includes the binder resin 2 and the first thermally conductive filler 3 oriented in the thickness direction B of the thermally conductive sheet 1 and has a contact thermal resistance with regard to the adherend of 0.46° C.·cm$^2$/W or less.

The production method for the thermally conductive sheet of the present technology is not limited to the example above. For example, a step D of pressing the sliced face may be further provided after step C. The production method for the thermally conductive sheet having the step D of pressing further smooths the surface of the sheet obtained at step C and can further improve adhesion with another member. As a method of pressing, a pair of pressing devices made of a flat plate and a press head having a flat surface can be used. Pressing may also be performed using a pinch roll. A pressing pressure can be, for example, 0.1 to 100 MPa. To increase an effect of pressing and to shorten a pressing time, the pressing is preferably performed at or above a glass transition temperature (Tg) of the binder resin 2. For example, the pressing temperature can be 0 to 180° C. and may be in a temperature range of room temperature (for example, 25° C.) to 100° C. or 30 to 100° C.

<Electronic Apparatus>

The thermally conductive sheet 1 of the present technology can be, for example, disposed between a heat-generating body as an adherend and a heat-radiating body in order to provide an electronic apparatus (thermal device) of a structure in which the sheet is disposed between these bodies so as to release heat generated in the heat-generating body to the heat-radiating body. The electronic apparatus has at least the heat-generating body, the heat-radiating body, and the thermally conductive sheet 1 and, as necessary, may further have another member.

The heat-generating body is not particularly limited. For example, a CPU (central processing unit), a GPU (graphics processing unit), a DRAM (dynamic random-access memory), a flash memory, or another integrated circuit element and a transistor, a resistor, or another electronic component that generates heat in an electrical circuit can be mentioned. The heat-generating body also includes a component that receives an optical signal, such as an optical transceiver in a communication apparatus.

The heat-radiating body is not particularly limited. For example, a heat sink, a heat spreader, or another component that is used by being combined with an integrated circuit element, transistor, optical transceiver case, or the like can be mentioned. The heat-radiating body may be a component other than a heat spreader or a heat sink as long as it conducts heat generated from a heat source and diffuses this to the outside. For example, a radiator, a cooler, a die pad, a printed board, a cooling fan, a Peltier element, a heat pipe, a metal cover, and a case can be mentioned.

Figure 4:
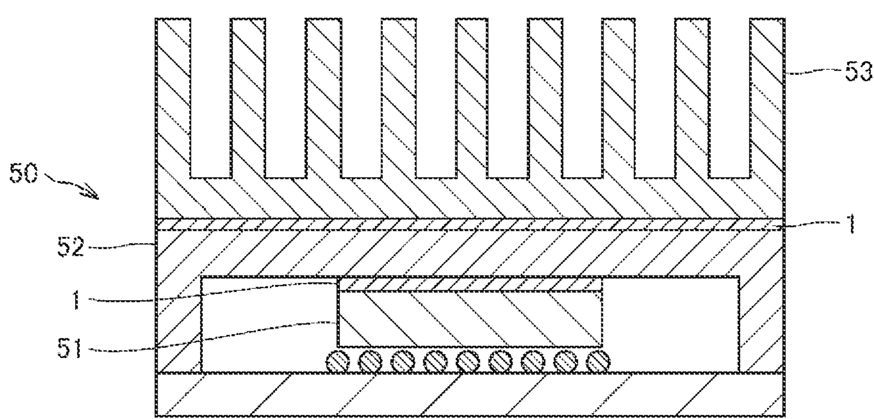
FIG. 4 is a sectional view illustrating one example of a semiconductor device in which the thermally conductive sheet of the present technology is applied.

FIG. 4 is a sectional view illustrating one example of a semiconductor device 50 in which the thermally conductive sheet 1 of the present technology is applied. For example, the thermally conductive sheet 1 is, as illustrated in FIG. 4, mounted in the semiconductor device 50 built into various electronic apparatuses and is interposed between a heat-generating body and a heat-radiating body. The semiconductor device 50 illustrated in FIG. 4 is provided with an electronic component 51, a heat spreader 52, and the thermally conductive sheet 1. The thermally conductive sheet 1 is interposed between the heat spreader 52 and the electronic component 51. By the thermally conductive sheet 1 being interposed between the heat spreader 52 and a heat sink 53, the sheet and the heat spreader 52 constitute a heat-radiating member that radiates heat of the electronic component 51. A mounting location of the thermally conductive sheet 1 is not limited to between the heat spreader 52 and the electronic component 51 or between the heat spreader 52 and the heat sink 53 and can be selected as appropriate according to a configuration of the electronic apparatus or semiconductor device.

EXAMPLES

Examples of the present technology are described below. In the examples, a thermally conductive sheet was made, and a thermal resistance, a contact thermal resistance, a bulk thermal conductivity, and a breakdown voltage of the thermally conductive sheet were found. Note that the present technology is not limited to these examples.

Example 1

A silicone resin at 30% by volume, alumina particles (D50 of 15 μm) at 18% by volume, alumina particles (D50 of 5 μm) at 12% by volume, granulated aluminum nitride (D50 of 1.5 μm) at 33% by volume, zinc oxide (D50 of 0.5 μm) at 1% by volume, pitch carbon fibers of an average fiber length of 110 μm at 5% by volume, and a coupling agent at 1% by volume were mixed together to prepare a resin composition for forming a thermally conductive sheet. Using an extrusion method, the resin composition for forming a thermally conductive sheet was poured into a mold (opening portion: 50 mm×50 mm) having a rectangular-parallelepiped-shaped interior space. This was heated for 4 hours in a 60° C. oven to form a molded block. Note that a polyethylene terephthalate release film was affixed to an inner face of the mold so that release-treatment face would be on an inner side. Using a slicer, the obtained molded block was sliced, in a direction orthogonal to a length direction of the molded block, to a desired thickness. This provided a thermally conductive sheet in which the carbon fibers were oriented in a thickness direction of the sheet.

Example 2

100 g of pitch carbon fibers of an average fiber diameter of 9 μm and an average fiber length of 110 μm and 450 g of ethanol were added to a glass vessel. This was mixed using a stirring blade to obtain a slurry. Nitrogen was added to the slurry at a flow rate of 160 mL/min. to make the slurry inert. At the same time, 25 g of divinylbenzene (93% divinylbenzene) was added to the slurry. 10 minutes after adding the divinylbenzene, 0.500 g of a polymerization initiator (oil-soluble azoic polymerization initiator) dissolved in advance in 50 g of ethanol was added to the slurry. After this addition, this was stirred for 5 minutes, whereupon the process of using nitrogen to make the slurry inert was stopped. Afterward, while stirring, temperature raising was started. The temperature was held at 70° C. and lowered to 40° C. Note that the reaction time was made to be the period from starting temperature raising to starting temperature lowering. After temperature lowering, this was left standing for 15 minutes to precipitate the solids dispersed in the slurry. After precipitation, the supernatant was removed by decantation. 750 g of a solvent was again added, and this was stirred for 15 minutes to wash the solids. After washing, the solids were collected using suction filtration. The collected solids were dried for 6 hours at 100° C. to obtain DVB insulation-coated carbon fibers.

Next, a silicone resin at 28% by volume, alumina particles (D50 of 15 μm) at 30% by volume, alumina particles (D50 of 5 μm) at 1% by volume, granulated aluminum nitride (D50 of 1.5 μm) at 33% by volume, aluminum hydroxide (D50 of 8 μm) at 1% by volume, DVB insulation-coated carbon fibers of an average fiber length of 110 μm at 6% by volume, and a coupling agent at 1% by volume were mixed together to prepare a silicone composition. Using an extrusion method, the resin composition for forming a thermally conductive sheet was poured into a mold (opening portion: 50 mm×50 mm) having a rectangular-parallelepiped-shaped interior space. This was heated for 6 hours in a 100° C. oven to form a molded block. Note that a polyethylene terephthalate release film was affixed to an inner face of the mold so that a release-treatment face would be on an inner side. Using a slicer, the obtained molded block was sliced, in a direction orthogonal to a length direction of the molded block, to a desired thickness. This provided a thermally conductive sheet in which the carbon fibers were oriented in a thickness direction of the sheet.

Example 3

100 g of pitch carbon fibers of an average fiber diameter of 9 μm and an average fiber length of 110 μm, 200 g of tetraethoxysilane (TEOS), and 900 g of ethanol were added to a polyethylene vessel and mixed using a stirring blade. Afterward, while heating to 50° C., 176 g of a reaction initiator (10% ammonia water) was added over 5 minutes. This was stirred for 3 hours starting at the point when solvent addition was completed as 0 minutes. Upon ending stirring, the temperature was lowered, suction filtration was performed to collect the solids, the solids were washed using water and ethanol, suction filtration was performed again, and the solids were collected. The collected solids were dried for 2 hours at 100° C. and afterward fired for 8 hours at 200° C. to obtain $SiO_2$ insulation-coated carbon fibers.

Next, a silicone resin at 28% by volume, alumina particles (D50 of 15 μm) at 30% by volume, alumina particles (D50 of 5 μm) at 1% by volume, granulated aluminum nitride (D50 of 1.5 μm) at 33% by volume, aluminum hydroxide (D50 of 8 μm) at 1% by volume, $SiO_2$ insulation-coated carbon fibers of an average fiber length of 110 μm at 6% by volume, and a coupling agent at 1% by volume were mixed together to prepare a silicone composition. Using an extrusion method, the resin composition for forming a thermally conductive sheet was poured into a mold (opening portion: 50 mm×50 mm) having a rectangular-parallelepiped-shaped interior space. This was heated for 6 hours in a 100° C. oven to form a molded block. Note that a polyethylene terephthalate release film was affixed to an inner face of the mold so that a release-treatment face would be on an inner side. Using a slicer, the obtained molded block was sliced, in a direction orthogonal to a length direction of the molded block, to a desired thickness. This provided a thermally conductive sheet in which the carbon fibers were oriented in a thickness direction of the sheet.

Example 4

A silicone resin at 33% by volume, boron nitride flakes of a hexagonal crystal shape (D50 of 40 μm) at 26% by volume, an agglomerate powder of boron nitride (D50 of 20 μm) at 1% by volume, granulated aluminum nitride (D50 of 1.5 μm) at 20% by volume, alumina particles (D50 of 5 μm) at 19% by volume, and a coupling agent at 1% by volume were uniformly mixed together to prepare a resin composition for forming a thermally conductive sheet. Using an extrusion method, the resin composition for forming a thermally conductive sheet was poured into a mold (opening portion: 50 mm×50 mm) having a rectangular-parallelepiped-shaped interior space. This was heated for 4 hours in a 60° C. oven to form a molded block. Note that a polyethylene terephthalate release film was affixed to an inner face of the mold so that a release-treatment face would be on an inner side. Using a slicer, the obtained molded block was sliced, in a direction orthogonal to a length direction of the molded block, into a sheet. This provided a thermally conductive sheet in which the boron nitride flakes were oriented in a thickness direction of the sheet.

Example 5

A silicone resin at 33% by volume, alumina particles (D50 of 3 μm) at 42% by volume, carbon fibers of an average fiber length of 150 μm at 21.5% by volume, aluminum powder (D50 of 16 μm) at 2% by volume, graphite particles (D50 of 5 μm) at 1% by volume, and a coupling agent at 0.5% by volume were mixed together to prepare a silicone composition. Using an extrusion method, the resin composition for forming a thermally conductive sheet was poured into a mold (opening portion: 50 mm×50 mm) having a rectangular-parallelepiped-shaped interior space. This was heated for 6 hours in a 100° C. oven to form a molded block. Note that a polyethylene terephthalate release film was affixed to an inner face of the mold so that a release-treatment face would be on an inner side. Using a slicer, the obtained molded block was sliced, in a direction orthogonal to a length direction of the molded block, to a desired thickness. This provided a thermally conductive sheet in which the carbon fibers were oriented in a thickness direction of the sheet.

Comparative Example 1

A silicone resin at 52% by volume, boron nitride spheres (D50 of 60 μm) at 35% by volume, an agglomerate powder of boron nitride (D50 of 20 μm) at 6% by volume, crushed aluminum hydroxide (D50 of 8 μm) at 6% by volume, and a coupling agent at 1% by volume were uniformly mixed together to prepare a resin composition for forming a thermally conductive sheet. The resin composition for forming a thermally conductive sheet was applied onto a polyethylene terephthalate release film made into a release-treatment face. This was heated for 4 hours in a 60° C. oven to form a thermally conductive sheet.

<Thermal Resistance and Contact Thermal Resistance>

The thermal resistance of the thermally conductive sheet was measured according to the following procedure. The thermally conductive sheet was processed into a circle of a 20 mm diameter to obtain a test piece. The obtained test piece was interposed between copper, and the thermal resistance (° $C{\cdot}cm^2/W$) was measured under a load of 1 $kgf/cm^2$. The thermal resistance was measured by preparing three types of thermally conductive sheets, each with a different thickness, and measuring each thermally conductive sheet. Then, the contact thermal resistance (° $C{\cdot}cm^2/W$) was found from an intercept of a graph plotting the thickness (mm) of the thermally conductive sheet at the time of measurement on the horizontal axis and the thermal resistance on the vertical axis. The results are shown in Table 1.

<Bulk Thermal Conductivity>

The bulk thermal conductivity of the thermally conductive sheet was found from the inverse of the slope of the graph whereby the contact thermal resistance was found. The results are shown in Table 1.

<Breakdown Voltage>

The breakdown voltage of the thermally conductive sheet was measured using an ultra-high-voltage voltage resistance tester (made by Keisokugiken, Co; 7473) under conditions of a thickness of the thermally conductive sheet of 1 mm, a voltage raising rate of 0.05 kV/sec., and room temperature. The voltage at the point of breakdown was made to be the breakdown voltage (kV). The results are shown in Table 1. In Table 1, the result of Example 5 being "-" is a representation that the thermally conductive sheet of Example 5 had conductivity and thus could not be measured.

TABLE 1

| | Example 1 | Example 2 | Example 3 | Example 4 | Example 5 | Comparative Example 1 |
|---|---|---|---|---|---|---|
| Silicone resin [% by volume] | 30 | 28 | 28 | 33 | 33 | 52 |
| Carbon fibers Average fiber length: 110 μm [% by volume] | 5 | 6 | 6 | 0 | 21.5 | 0 |
| Alumina D50 = 15 μm [% by volume] | 18 | 30 | 30 | 0 | 0 | 0 |
| Alumina D50 = 5 μm [% by volume] | 12 | 1 | 1 | 19 | 42 | 0 |
| Aluminum nitride D50 = 1.5 μm [% by volume] | 33 | 33 | 33 | 20 | 0 | 0 |
| Zinc oxide D50 = 1 μm [% by volume] | 1 | 0 | 0 | 0 | 0 | 0 |
| Aluminum hydroxide (crushed) D50 = 8 μm [% by volume] | 0 | 1 | 1 | 0 | 0 | 6 |
| Aluminum D50 = 16 μm [% by volume] | 0 | 0 | 0 | 0 | 2 | 0 |
| Boron nitride spheres D50 = 60 μm [% by volume] | 0 | 0 | 0 | 0 | 0 | 35 |
| Boron nitride flakes D50 = 40 pm [% by volume] | 0 | 0 | 0 | 26 | 0 | 0 |
| Boron nitride (agglomerate powder) D50 = 20 μm [% by volume] | 0 | 0 | 0 | 1 | 0 | 6 |
| Graphite D50 = 5 μm [% by volume] | 0 | 0 | 0 | 0 | 1 | 0 |
| Coupling agent [% by volume] | 1 | 1 | 1 | 1 | 0.5 | 1 |
| Carbon fibers coated by $SiO_2$ | 0 | 0 | 6 | 0 | 0 | 0 |
| Carbon fibers coated by DVB | 0 | 6 | 0 | 0 | 0 | 0 |
| Orientation of carbon fibers or boron nitride flakes | Thickness direction | Thickness direction | Thickness direction | Thickness direction | Thickness direction | Horizontal direction |
| Bulk thermal conductivity [W/m · K] | 10.1 | 11.1 | 11.5 | 11.0 | 35.6 | 3.0 |
| Thermal resistance | 1.21° C. · $cm^2$/W (0.79 mm) 2.04° C. · $cm^2$/W (1.50 mm) 2.70° C. · $cm^2$/W (2.28 mm) | 1.00° C. · $cm^2$/W (0.800 mm) 1.75° C. · $cm^2$/W (1.64 mm) 2.50° C. · $cm^2$/W (2.46 mm) | 1.02° C. · $cm^2$/W (0.82 mm) 1.68° C. · $cm^2$/W (1.58 mm) 2.31° C. · $cm^2$/W (2.3 mm) | 1.06° C. · $cm^2$/W (0.990 mm) 1.94° C. · $cm^2$/W (1.84 mm) 2.71° C. · $cm^2$/W (2.71 mm) | 0.251° C. · $cm^2$/W (0.23 mm) 0.284° C. · $cm^2$/W (0.36 mm) 0.308° C. · $cm^2$/W (0.43 mm) | 5.68° C. · $cm^2$/W (1.13 mm) 8.77° C. · $cm^2$/W (1.79 mm) 11.08° C. · $cm^2$/W (2.70 mm) |
| Contact thermal resistance [° C. · $cm^2$/W] | 0.46 | 0.27 | 0.30 | 0.25 | 0.19 | 2.17 |
| Breakdown voltage [kV] at 1 mm | 0.50 | 1.13 | 0.99 | 6.02 | — | 10.1 |

It was found that the thermally conductive sheets obtained in Examples 1 to 5 include a binder resin and a thermally conductive filler, have the thermally conductive filler oriented in a thickness direction, and have a contact thermal resistance with regard to an adherend of 0.46° C.·$cm^2$/W or less.

Furthermore, it was found that the thermally conductive sheets obtained in Examples 1 to 4 have a breakdown voltage of 0.50 kV or greater when a thickness of the thermally conductive sheet is 1 mm, having a favorable contact thermal resistance with regard to an adherend as well as favorable insulation.

It was found that the thermally conductive sheet obtained in Comparative Example 1 has a contact thermal resistance with regard to an adherend that does not meet 0.46° C.·$cm^2$/W or less. Moreover, it was found that the thermally conductive filler is not oriented in a thickness direction of the thermally conductive sheet obtained in Comparative Example 1.

REFERENCE SIGNS LIST

1 thermally conductive sheet, 2 binder resin, 3 first thermally conductive filler, 3A boron nitride flake, 3B carbon fiber, a major axis, b thickness, c minor axis, 4 second thermally conductive filler, 5 insulating film, 6 insulation-coated carbon fiber, 50 semiconductor device, 51 electronic component, 52 heat spreader, 53 heat sink

The invention claimed is:

1. A thermally conductive sheet, comprising:

a binder resin;

a first thermally conductive filler oriented in a thickness direction of the thermally conductive sheet at 60 to 120 degrees relative to a surface of the thermally conductive sheet; and a second thermally conductive filler, wherein the thermally conductive sheet has a contact thermal resistance with regard to an adherend of 0.46° C.·cm$^2$/W or less, the first thermally conductive filler is at least one selected from the group consisting of a fibrous thermally conductive filler and a flaky thermally conductive filler, the thermally conductive sheet comprises the fibrous thermally conductive filler in an amount of 10% by volume or less or comprises no fibrous thermally conductive filler, and the second thermally conductive filler is at least one selected from a group consisting of alumina, aluminum, zinc oxide, boron nitride, aluminum nitride, graphite, and a magnetic powder.

2. The thermally conductive sheet of claim 1, wherein the first thermally conductive filler has an insulating coating on a surface thereof.

3. The thermally conductive sheet of claim 1, wherein the first thermally conductive filler is an insulation-coated carbon fiber having an insulating coating on a surface thereof, and/or a boron nitride flake.

4. The thermally conductive sheet of claim 1, wherein the thermally conductive sheet has a breakdown voltage of 0.50 kV or higher when the thermally conductive sheet has a thickness of 1 mm.

5. The thermally conductive sheet of claim 1, wherein the thermally conductive sheet has a thermal resistance of 2.71° C.·cm$^2$/W or less.

6. The thermally conductive sheet of claim 1, wherein the binder resin is a silicone resin.

7. The thermally conductive sheet of claim 1, wherein the second thermally conductive filler is a combination of alumina, aluminum nitride, and zinc oxide; a combination of alumina, aluminum nitride, and aluminum hydroxide; a combination of alumina, aluminum nitride, and boron nitride; or a combination of alumina, aluminum, and graphite.

8. An electronic apparatus, comprising:

a heat-generating body;

a heat-radiating body;

and the thermally conductive sheet of claim 1 disposed between the heat-generating body and the heat-radiating body.

9. A production method for a thermally conductive sheet, comprising:

dispersing a first thermally conductive filler and a second thermally conductive filler in a binder resin to prepare a resin composition for forming a thermally conductive sheet;

forming a molded block from the resin composition; and slicing the molded block into a sheet to obtain the thermally conductive sheet; wherein the first thermally conductive filler is oriented in a thickness direction of the thermally conductive sheet at 60 to 120 degrees relative to a surface of the thermally conductive sheet and the thermally conductive sheet has a contact thermal resistance with regard to an adherend of 0.46° C.·cm$^2$/W or less, the first thermally conductive filler is at least one selected from the group consisting of a fibrous thermally conductive filler and a flaky thermally conductive filler, the thermally conductive sheet comprises the fibrous thermally conductive filler in an amount of 10% by volume or less or comprises no fibrous thermally conductive filler, and the second thermally conductive filler is at least one selected from a group consisting of alumina, aluminum, zinc oxide, boron nitride, aluminum nitride, graphite, and a magnetic powder.

10. The thermally conductive sheet of claim 1, wherein the fibrous thermally conductive filler is a carbon fiber, and the flaky thermally conductive filler is a hexagonal crystal boron nitride flake.

11. The thermally conductive sheet of claim 1, wherein the first thermally conductive filler comprises the flaky thermally conductive filler.

12. The thermally conductive sheet of claim 11, wherein an average particle size of the flaky thermally conductive filler is 20 to 100 μm.

13. The thermally conductive sheet of claim 1, wherein the first thermally conductive filler comprises a hexagonal crystal boron nitride flake as the flaky thermally conductive filler.

14. The thermally conductive sheet of claim 13, wherein an average particle size of the hexagonal crystal boron nitride flake is 20 to 100 μm.

15. The thermally conductive sheet of claim 1, wherein a content of the first thermally conductive filler in the thermally conductive sheet is 20% by volume or more.

16. The thermally conductive sheet of claim 1, wherein a content of the second thermally conductive filler in the thermally conductive sheet is 30% by volume or more.

* * * * *